(12) United States Patent
Schliebe

(10) Patent No.: US 6,375,473 B1
(45) Date of Patent: Apr. 23, 2002

(54) ELECTRICAL INTERCONNECTION FOR AN ELECTRO-HYDRAULIC BRAKE SYSTEM USING WIRE FORM BUTTONS

(75) Inventor: Paul M. Schliebe, Dexter, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/566,157

(22) Filed: May 5, 2000

(51) Int. Cl.$^7$ .......................... H01R 12/00; H01R 4/58; H05K 1/00
(52) U.S. Cl. ..................... 439/66; 439/91; 439/930
(58) Field of Search ..................... 439/930, 91, 66, 439/74

(56) References Cited

U.S. PATENT DOCUMENTS

| | | | |
|---|---|---|---|
| 4,988,305 A | * | 1/1991 | Svenkeson et al. ........... 439/65 |
| 4,988,306 A | | 1/1991 | Hopfer, III et al. |
| 4,992,053 A | | 2/1991 | Lindeman et al. |
| 5,013,249 A | | 5/1991 | Lindeman et al. |
| 5,127,837 A | | 7/1992 | Shah et al. |
| 5,324,205 A | | 6/1994 | Ahmad et al. |
| 5,356,298 A | | 10/1994 | Voss et al. |
| 5,382,169 A | | 1/1995 | Bailey et al. |
| 5,645,433 A | * | 7/1997 | Johnson ........................ 439/66 |
| 5,744,759 A | | 4/1998 | Ameen et al. |
| 5,911,583 A | | 6/1999 | Roybal et al. |
| 5,992,946 A | | 11/1999 | Bayer et al. |
| 6,102,709 A | * | 8/2000 | Howard et al. ............... 439/66 |
| 6,166,615 A | * | 12/2000 | Winslow et al. ............ 333/260 |

* cited by examiner

Primary Examiner—P. Austin Bradley
Assistant Examiner—Edwin A. León
(74) Attorney, Agent, or Firm—MacMillan, Sobanski & Todd, LLC

(57) ABSTRACT

An electrical connector includes a plurality of conductors having first and second ends. The first end of each of the conductors is electrically connected to a first printed circuit board. The second end of each of the conductors is received in a bore which extends through a member formed from an electrically insulative material. Each bore also receives a wire form button which contacts the second end of the conductor and extends from the bore. The wire form buttons are in electrical contact with corresponding terminal contact pads formed upon a second printed circuit board. The conductors flex to urge the wire form buttons against the terminal contact pads.

7 Claims, 8 Drawing Sheets

ELECTRICAL INTERCONNECTION FOR AN ELECTRO-HYDRAULIC BRAKE SYSTEM USING WIRE FORM BUTTONS

BACKGROUND OF THE INVENTION

This invention relates in general to electro-hydraulic brake systems and in particular to an electrical interconnection between an electronic control unit and a hydraulic valve body for an electro-hydraulic brake system which uses wire form buttons.

An Electro-Hydraulic Brake (EHB) system combines the advantages of an electric braking system with components of a conventional hydraulic brake system. Thus, an EHB system can be considered as an intermediate hybrid system which includes features of both a conventional hydraulic brake system and a brake by wire system (BBW). By utilizing conventional hydraulic brake components, development and conformance costs and times are reduced.

Referring now to FIG. 1, there is shown, generally at 10, a typical EHB system. The EHB system 10 includes a pedal unit 11 which is hydraulically connected to a Hydraulic Control Valve (HCV) 12. The HCV 12 forms an interface between the pedal unit 11 and a pair of conventional hydraulically actuated vehicle front wheel brakes 13 and a pair of conventional hydraulically actuated vehicle rear wheel brakes 14.

The pedal unit 11 includes a tandem master cylinder 15 which is supplied with brake fluid from a master cylinder reservoir 16. The master cylinder 15 is connected by a conventional mechanical linkage to a vehicle brake pedal 17. The brake pedal 17 also is coupled to a displacement transducer 18 which generates an electrical signal having an amplitude which is proportional to brake pedal travel. One chamber of the master cylinder 15 is connected by a first hydraulic brake line 19 while the other chamber of the master cylinder 15 is connected to a second hydraulic brake line 20. The pedal unit 11 also includes a normally closed valve 21 which connects the first brake hydraulic brake line 20 circuit to a pedal travel simulator 22. The pedal travel simulator 22 is an electro-hydraulic device which is operative during operation of the EHB system 10 to provide brake pedal resistance and force as feedback to the vehicle operator.

The HCV 12 includes a first normally open isolation valve 23 which is connected between the first hydraulic brake line 19 and one of the front wheel brakes 13 and a second normally open isolation valve 24 which is connected between the second hydraulic brake line 20 and the other of the front wheel brakes 13. Each of the front wheel brakes 13 is connected through an isolator piston 25 to a pair of proportional control valves 26 whose purpose will be explained below. The second valve of each pair of proportional control valves 26 is connected to a corresponding rear wheel brake 14. The isolator pistons 25 hydraulically isolate the front wheel brakes 13 from the rear wheel brakes 14. As shown in FIG. 1, the front wheel brakes 13 are hydraulically connected through a first balance valve 27. Similarly, the rear wheel brakes 14 are hydraulically connected through a second balance valve 28.

The HCV 12 further includes a motor driven pump 35 as a source of pressurized brake fluid for actuation of the wheel brakes 13 and 14. The pump 35 has an intake port which draws brake fluid through a hydraulic line 36 from the master cylinder reservoir 16. The pump 35 also has a discharge port which is connected through each of the proportional control valves 26 to a corresponding front or rear wheel brake 13 or 14. Each of the proportional control valves 26 includes a discharge port which is connected though a hydraulic discharge line 38 to the master cylinder reservoir 16. The discharge port of the pump 35 also is connected through a relief valve 39 to a high pressure accumulator 40.

A plurality of pressure sensors are included in the EHB 10. The pressure applied to the HCV 12 by the master cylinder 15 is monitored by a brake actuation pressure sensor 45 which is illustrated in FIG. 1 as being mounted in the first hydraulic brake line 19 between the master cylinder 15 and the first isolation valve 23. Alternately, the brake actuation pressure sensor 45 can be mounted in the second hydraulic brake line 20 between the master cylinder 15 and the second isolation valve 24 (not shown). The brake actuation pressure sensor 45 is rated to measure relatively low pressures which are on an order of magnitude of 60 bar (900 psi). A wheel brake pressure sensor 47 is included in each hydraulic line connecting each proportional control valve 26 to the associated wheel brake. The wheel brake pressure sensors 47 monitor the pressure being applied to the associated wheel brake and are rated to measure relatively high brake actuation pressures which are on an order of magnitude of 200 bar (3,000 psi). An accumulator pressure sensor 48 is connected to the high pressure accumulator 40 and monitors the output pressure of the accumulator 40. When the pump pressure exceeds the accumulator pressure or when the relief valve 39 is open, the accumulator pressure sensor 48 measures the pump output pressure. The accumulator pressure sensor 48 is also rated to measure relatively high pressures which are on an order of magnitude of 200 bar (3,000 psi).

The solenoid valves and pressure sensors are electrically connected to a microprocessor (not shown) which is included in an Electronic Control Module (ECU) (not shown). The ECU can either be mounted upon the HCV 12 or located remotely from the HCV 12. When the ECU is mounted upon the HCV 12, the combined unit is typically referred to as a Hydraulic Control Unit (HCU). The ECU microprocessor is programmed with appropriate software to monitor the output signals from the pressure sensors 45, 47 and 48 and the brake pedal transducer 18. The microprocessor is responsive to the sensed pressures and displacement of the brake pedal transducer 18 to energize the pump 35 and close the isolation valves 23 and 24. The microprocessor then selectively actuates the proportional control valves 26 to supply pressurized hydraulic fluid for actuation of the wheel brakes 13 and 14.

The operation to the EHB 10 will now be described. During vehicle operation, the microprocessor associated with the ECU continuously receives electrical signals from the brake pedal transducer 18 and the pressure sensors 45, 47 and 48. The microprocessor monitors the condition of the brake pedal transducer 18 and the pressure signals from the brake actuation pressure sensors 45 for potential brake applications. When the vehicle brake pedal 17 is depressed, the brake pedal displacement transducer 18 generates a displacement signal. Simultaneously, the brake actuation pressure sensor 45 generates a signal which is proportional to the force applied to the brake pedal 17. The microprocessor is operative to combine the displacement and force signals into a brake command signal. The microprocessor software is responsive to the brake command signal to actuate the pump motor and close the isolation valves 23 and 24 to separate the master cylinder 15 from the wheel brakes 13 and 14. The microprocessor then selectively operates the proportional control valves 26 in the HCV 12 unit to cyclically relieve and reapply hydraulic pressure to the wheel brakes 13 and 14. The hydraulic pressure applied to the wheel brakes 13 and 14 is adjusted by the operation of the proportional control valves 26 to produce adequate brake torque to decelerate the vehicle in accordance with the brake command signal generated by the vehicle operator.

If the EHB system 10 should fail, the isolation valves 23 and 24 return to their normally open positions to provide unassisted push though braking by allowing direct hydraulic communication between the master cylinder 15 and the front wheel brakes 13.

Referring again to the figures, a sectional view of a typical ECU 50 is illustrated in FIG. 2. The ECU 50 is mounted upon a HCV 12 to form a HCU 52. The ECU 50 includes a housing 54 which is typically injection molded from a plastic material. A metal cover 56 is attached to the upper edge of the housing 54 A main Printed Circuit Board (PCB) 58 is mounted upon the lower surface of the cover 56. Accordingly, the cover 56 functions as a heat sink for the main PCB 58. The EHB system control electronics 59 are mounted upon the main PCB 58. A male electrical connector 60 is mounted upon the lower surface of the main PCB 58 and extends in a downward direction in FIG. 2. Similarly, coil lead wires 62 extend from the main PCB 58 to a plurality of solenoid coils 64 (one shown) which are disposed within the housing 54. The male connector 60 and coil lead wires 62 are wave soldered to the main PCB 58 and the associated openings in the cover 56 are sealed with a potting material 66. A seal 67 is disposed between the lower edge of the housing 54 and the HCV 12. The ECU 50 is removeably attached to the HCV 12 by a plurality of threaded fasteners (not shown).

As described above, the HCV 12 carries a plurality of solenoid valves 68 (not shown). Each of the valves 68 has a sleeve 69 which extends upward in FIG. 2 from the upper surface of the HCV 12 and into an associated solenoid coil 64. The HCV 12 also carries a Pressure Sensor Cluster (PSC) 70 which is attached to the HCV 12 by a plurality of threaded fasteners 72. The PSC 70 includes a manifold 74 having a plurality of bores 75 formed therein (one shown). A cylindrical pressure sensing element 76 is disposed in each of the bores 75 formed in the PSC manifold 70. A transfer tube 78 extends from the HCV 12 and into each of the pressure sensing elements 76. The transfer tubes 78 communicate with interior passages formed in the HCV 12 to supply pressurized brake fluid to the pressure sensing elements 76. A pressure sensing array 79 is mounted upon the top surface of each pressure sensing element 76. The pressure sensing array 79 is connected by wire bonds 80 to a PSC PCB 82 which is mounted upon the top surface of the PSC 70. The PSC PCB 82 carries a signal conditioning circuit 84. A female electrical connector 86 also is mounted upon the PSC PCB 82 and cooperates with the male connector 60 mounted upon the main PCB 58 to provide an electrical interface between the pressure sensing elements 76 and the EHB control electronics 59. A more detailed description of the PSC 70 will be found in co-pending U.S. patent application Ser. No. 09/448,116, which is hereby incorporated by reference.

SUMMARY OF THE INVENTION

This invention relates to an electrical interconnection between an electronic control unit and a hydraulic valve body for an anti-lock brake system which uses wire form buttons.

As described above, it is known to connect the main PCB in an EHB system ECU to a PCB for a PSC with an pair of male and female electrical connectors. However, both the male and female connector are rigidly soldered to their respective PCB's. Accordingly, significant horizontal and vertical stack up tolerances of the individual components can prevent proper mating of the connectors. Additionally, such mechanical connectors can be unreliable. Alternately, the PSC PCB can be wire bonded to the main ECU PCB; however, such wire bonding must occur during final assembly and requires that the ECU be sealed after the wire bonding. It is possible to provide terminals for the PSC PCB which extend through the main ECU PCB. The terminals are then soldered to the main ECU PCB at the final assembly plant. Again, such a process requires the addition of a soldering process at the final assembly plant which must take place on a large and bulky HCU. Finally, the PSC could be assembled into the ECU at the ECU assembly plant with the PSC terminals soldered to the main ECU PCB. The combined ECU and PSC would then be assembled to the HCV at final assembly. However, this approach requires that the threaded fasteners which secure the PSC to the HCV would extend through the ECU housing and require sealing after installation. Accordingly, it would be desirable to provide an improved electrical connector between the PSC and the main ECU PCB.

The present invention contemplates an electrical connector including at least one conductor having a first end adapted to be secured to a printed circuit board and a second end opposite from the first end. The connector also includes a member formed from an electrically insulative material, the member having a bore formed therethrough which has a first end and a second end opposite from the first end. The first end of the bore receives the second end of the conductor and a wire form button is disposed within the bore in contact with the second end of the conductor. The wire form button extends from the second end of said bore. The connector is formed as a spring which is operative to urge the block and wire form button in a direction away from the first end of said conductor.

It is further contemplated that the connector can include a plurality of conductors and wire form buttons. The connector also can include a second block of insulative material having a plurality of bores formed therethrough with the first end of each conductor extending through one of the bores.

The invention also contemplates an electrical connector assembly which includes the above connector. The assembly includes first and second printed circuit boards. The first end of the conductors are secured to the first printed circuit board. The second printed circuit board has plurality of contact pads formed thereon. Each of the contact pads corresponds to one of the conductors. The spring action of the connectors urges the wire form buttons into contact with the contact pads to electrically connect the first printed circuit board to the second printed circuit board.

The electrical connector assembly can be mounted within a housing which is removeably attached to a hydraulic control valve. The housing can be formed with a pair of integral support arms extending across the interior thereof. The support arms receive the block containing the wire form buttons and position the block relative to the second printed circuit board. In the preferred embodiment, the hydraulic control valve is included in an electro-hydraulic brake system.

The electrical connector can also be utilized to provide an electrical connection between a printed circuit board and a solenoid coil.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
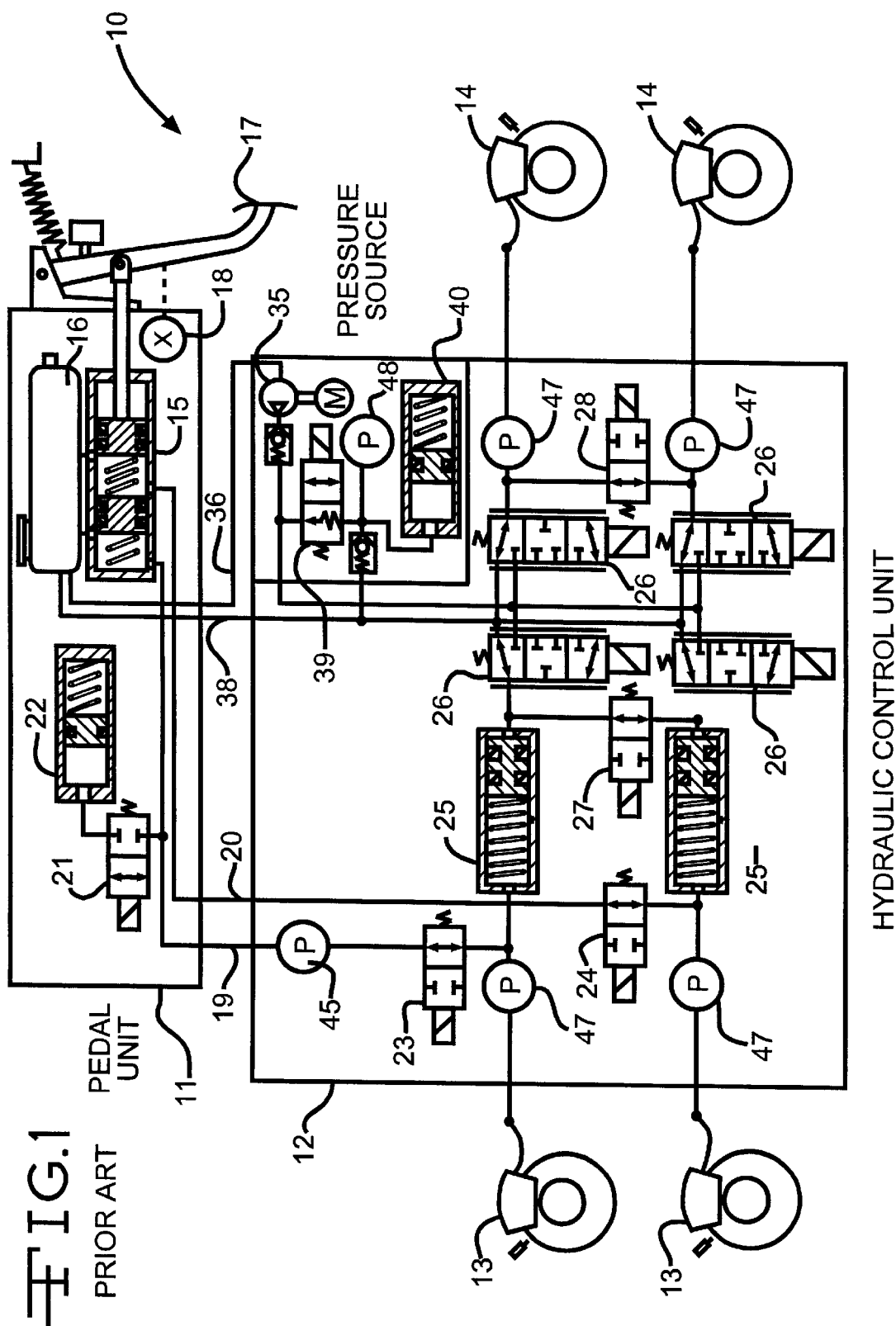
FIG. 1 is a schematic diagram of a typical electro-hydraulic brake system.
Figure 2:
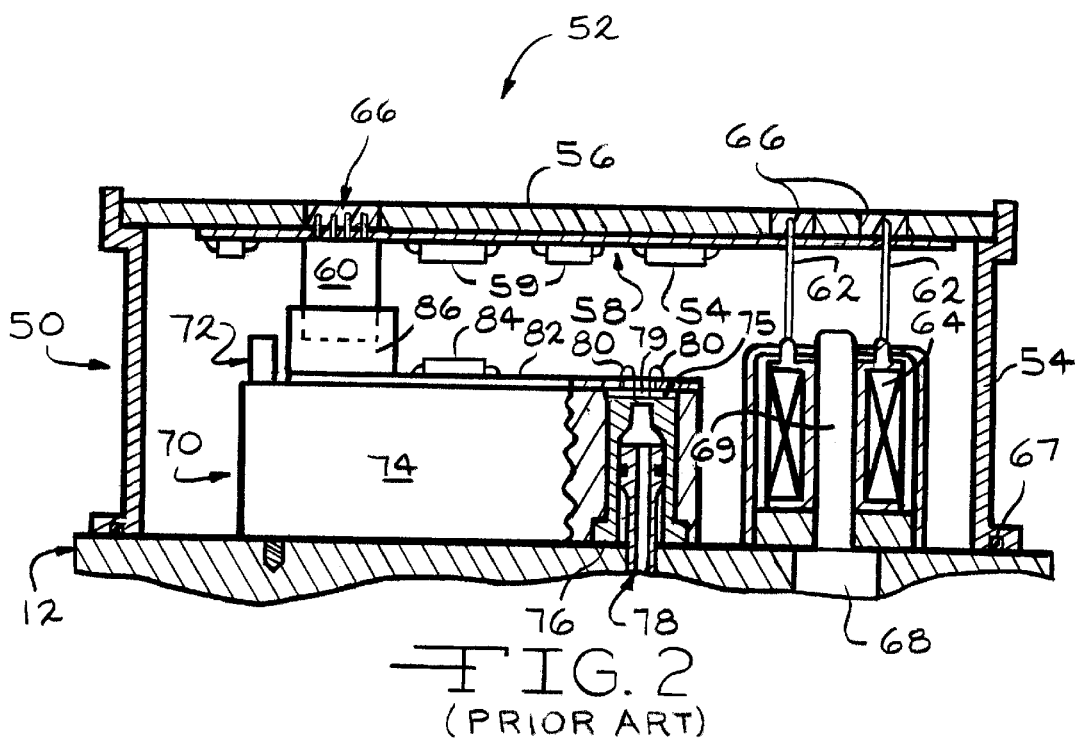
FIG. 2 is a sectional view of an Electronic Control Unit mounted upon a Hydraulic Control Valve which includes a prior art electrical connector.
Figure 3:
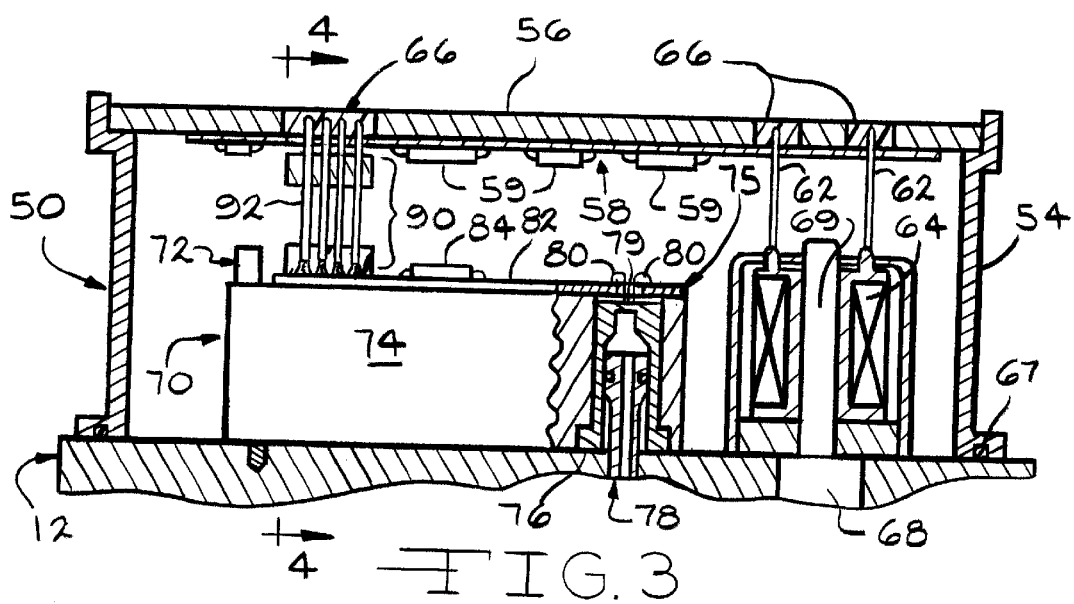
FIG. 3 is a sectional view of an Electronic Control Unit mounted upon a Hydraulic Control Valve which includes an electrical connector in accordance with the invention.
Figure 4:
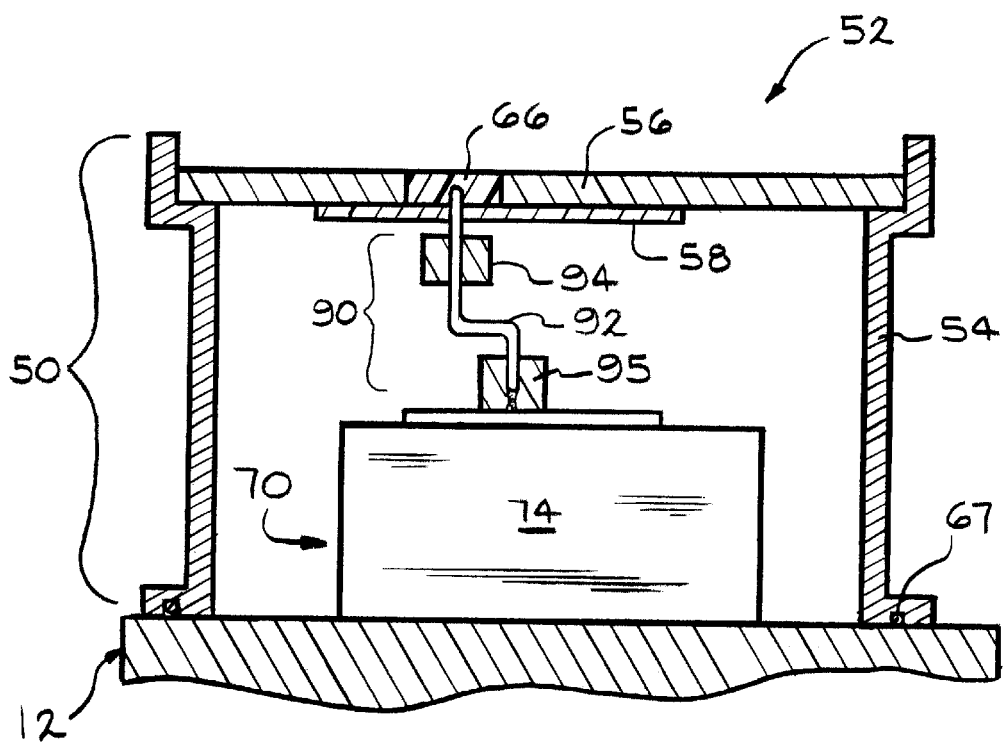
FIG. 4 is a sectional view of the Electronic Control Unit shown in FIG. 3 taken along line 3—3.

Referring once more to the drawings, there is illustrated in FIGS. 3 and 4 an improved electrical connector 90 which provides an electrical interface between a Pressure Sensor Cluster (PSC) 70 Printed Circuit Board (PCB) 82 and a main PCB 58 carried within an Electronic Control Unit (ECU) 50. Components shown in FIGS. 3 and 4 which are similar to components shown in FIG. 2 have the same numerical identifiers.

The connector 90 includes a plurality of parallel conductors 92 which are formed of an electrically conductive material, such as, for example, copper, bronze, or BeCu. While four conductors 92 are shown in FIG. 3, it will be appreciated that the invention can be practiced with more or less conductors 92. The conductors 92 are insert molded or stitched into rectangular shaped upper and lower headers, which are labeled 94 and 95, respectively. In the preferred embodiment, the headers 94 and 95 are formed from a plastic material; however, other electrically insulative materials also can be used.

Figure 5:
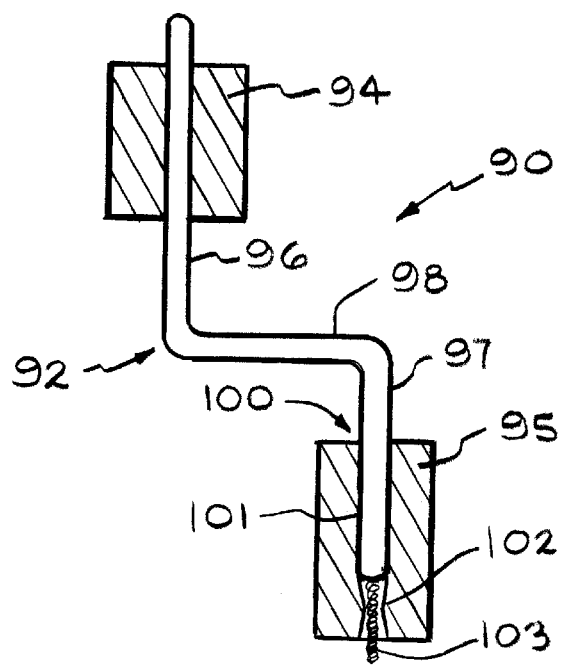
FIG. 5 is an enlarged view of the electrical connector shown in FIGS. 3 and 4.

As best seen in FIG. 5, each of the conductors 92 includes an upper portion 96 and a lower portion 97 which extend in a vertical direction in the figure. Accordingly, the upper portion 96 is generally perpendicular to the main ECU PCB 58. Similarly, the lower portion 97 is generally perpendicular to the PSC PCB 82. The upper and lower portions 96 and 97 are connected by an intermediate portion 98 which extends in a horizontal direction in FIG. 5. Thus, the connectors 92 have a S-shape. As will be explained below, the intermediate portion 98 functions as a spring arm to urge the lower portion 97 in a downward direction toward the PSC PCB 82. The upper portion 96 of each conductor 92 extends through the upper header 94 and into a corresponding opening formed through the ECU PCB 58. The end of the upper portion 96 of each of the conductors 92 is electrically connected to circuit traces deposited upon the ECU PCB 58 by a conventional process, such as wave soldering. The solder connection also secures the connector 90 to the ECU PCB 58.

The lower header 95 has a plurality of vertically directed bores 100 extending therethrough. An upper portion 101 of each of the bores 100 receives the end of the lower portion 97 of each of the conductors 92. In the preferred embodiment, a lower portion 102 of each of the bores 100 has an hourglass shape. A resilient metal contact is deposed in the lower portion 102 of each of the bores 100. In the preferred embodiment, the contact is a commercially available wire form button 103, such as a CIN::APSE® contact which is available from the Cinch Connector Division or a wire button contact which is available from Technic. The wire form button 103, which is commonly called a "fuzz button", is typically a resiliently wadded conductor, usually in the form of an elongated cylindrical contact element comprising a resiliently and randomly wadded single thin gauge electrically conductive wire. Typically, the wire form button 103 is formed from a refractory metal, such as molybdenum, which can be temperature cycled without losing its elasticity. The refractory metal is usually plated by a metal having a high electrical conductance, such as nickel or gold. The wire form buttons 103 are retained by the hour glass shape of the lower portion 102 of the lower header bores 100; however, it will be appreciated that the lower portions 102 of the header bores 100 can have other shapes than an hourglass. As best seen in FIG. 5, the upper end of each wire form button 103 is pressed into electrical contact with the end of the conductor lower portion 97 while the lower end of each wire form button 103 extends beyond the end of the lower header bore 100. While the preferred embodiment is illustrated in FIG. 5 with each of the conductor lower portions 97 simply pressed into a corresponding lower header bore 100, it will be appreciated that the invention also can be practiced with the conductor lower portion 97 having a different shape (not shown). For example, the conductor lower portion 97 can be upset to have an L-shape or other shape within the bore 100 to better secure the conductor lower portion 97 within the bore 100.

Figure 6:
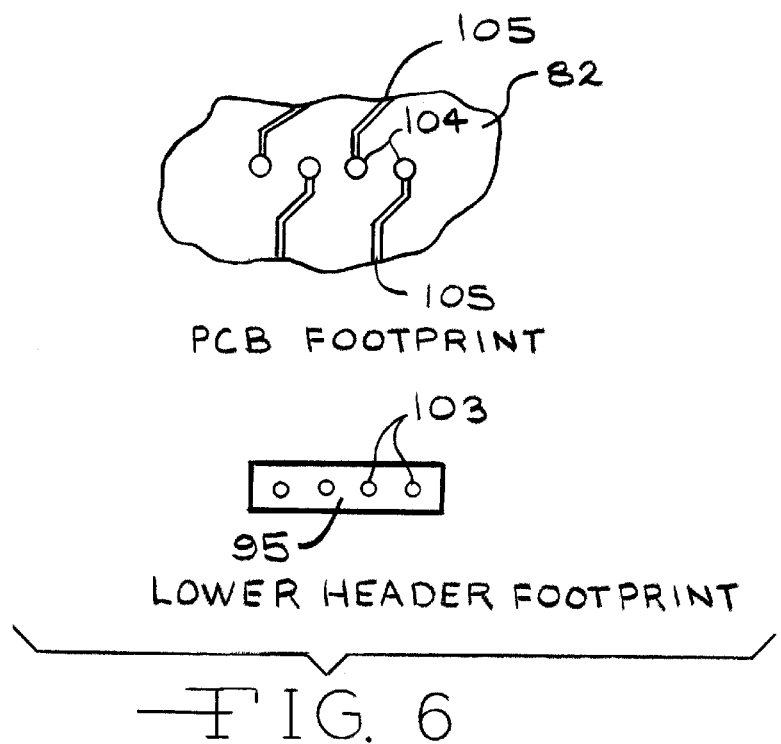
FIG. 6 illustrates printed circuit board contacts for the electrical connector shown in FIGS. 3 and 4.
Figure 7:
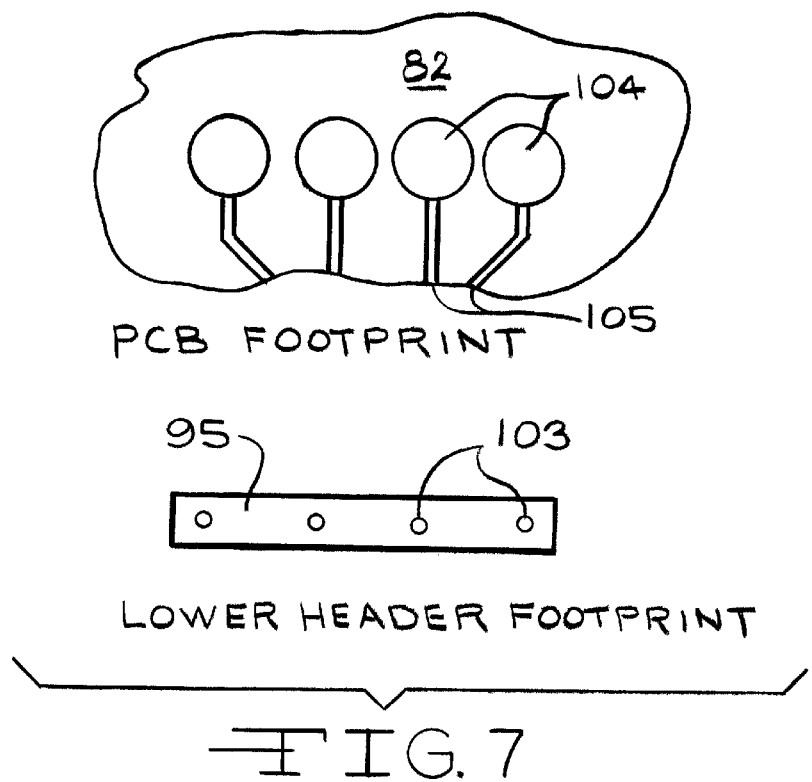
FIG. 7 illustrates an alternate embodiment of the printed circuit board contacts shown in FIG. 6.

The invention contemplates that each wire form button 103 is pressed against a corresponding terminal contact pad 104. A plurality of terminal contact pads 104 are formed in a linear array upon the surface of the PSC PCB 82, as shown in FIG. 6. Also shown in FIG. 6, is the corresponding footprint for the lower connector header 95. In the preferred embodiment, the terminal contact pads 104 are gold plated to enhance electrical conduction and prevent contact corrosion between the wire form buttons 103 and the contact pads 104. The terminal contact pads 104 are connected to electrical circuit traces 105 deposited upon the surface of the PSC PCB 82. The traces 105 and associated electronic components (not shown) comprise the signal conditioning circuit for the PSC 70. When the ECU 50 is attached to the HCV 12, the intermediate portions 98 of the connectors 92 are flexed in an upward direction. As a result, the intermediate portions 98 function as a spring arm to urge the lower header 95 toward the surface of the PSC PCB 82 and compress the wire form buttons 103 against the corresponding terminal contact pads 104. Because a surface connection is made between the wire form buttons 103 and the terminal contact pads 104, the connector 90 compensates for any component vertical stack up tolerance. Such vertical stack up tolerances typically exceed the stack up compensation capability of the wire form buttons 103. Since the contacts 104 use an area or linear array type of flush contact, the amount of horizontal tolerance is limited only by the allowable contact surface area. Thus, additional tolerances can be provided by enlarging the diameter of the terminal contact pads 104, as illustrated in FIG. 7.

Because the PSC PCB 82 already requires gold plating for the pressure sensing arrays to be wire bonded to the signal conditioning circuit, the gold plating of the terminal contact pads 104 does not significantly increase the cost of manufacturing the ECU 52. In previous designs, a connector was soldered to the PSC PCB 82 prior to assembling the PCB 82 to the PSC manifold 74. Since there are no other through hole components on the PSC PCB 82, a wave or selective soldering process for attachment of the connector is eliminated. If there are no bottom side surface mount components on the PSC PCB 82, the PCB 82 can be directly laminated onto the PSC manifold 74 using a conventional method for attaching a PCB to a heat sink. This provides greater flexibility of design.

The wire form button 103 can be separated from the associated terminal contact pad 104 without damaging the components. Thus, in the event of an ECU failure in the factory or the field, the ECU can be removed from the HCV for servicing without disturbing the hydraulic brake circuit. Replacement ECU's for field installation use would include a removable shipping cap (not shown) which covers and protects the connector 90 until the ECU is installed upon a HCV.

Figure 8:
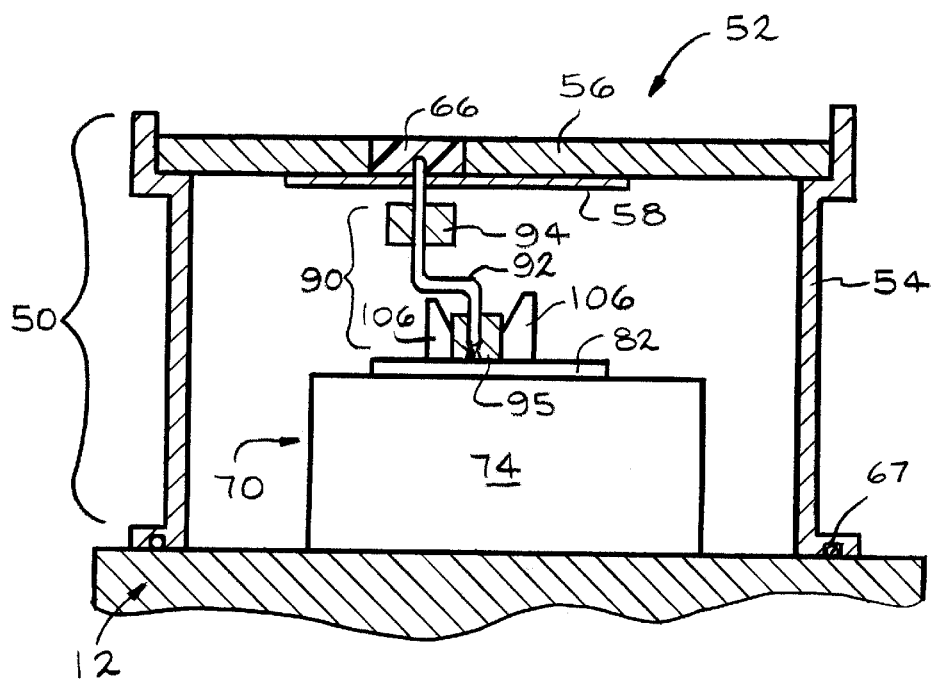
FIG. 8 is a sectional view of an alternate embodiment of the Electronic Control Unit shown in FIG. 4.

The invention also contemplates a pair of locator posts 106 which extend perpendicularly from the PSC PCB 82, as illustrated in FIG. 8. The upper ends of the locator posts 106 are beveled to guide the lower header 95 into contact with the terminal pads 104, as allowed by the inherent flexibility of the conductors 92.

Figure 9:
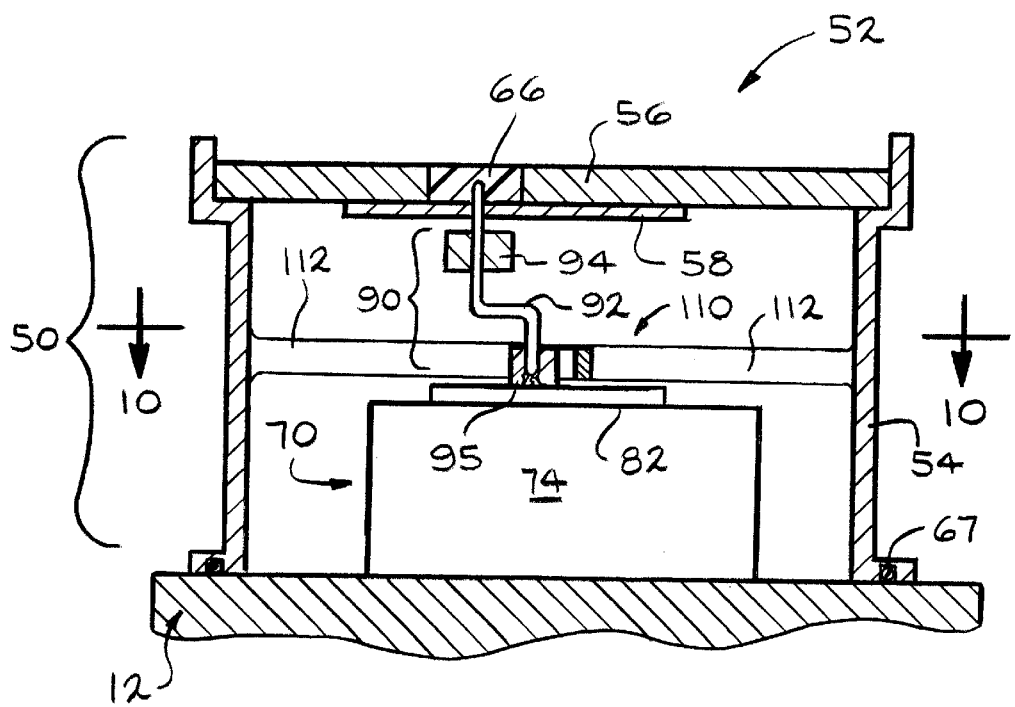
FIG. 9 is a sectional view of another alternate embodiment of the Electronic Control Unit shown in FIG. 4.
Figure 10:
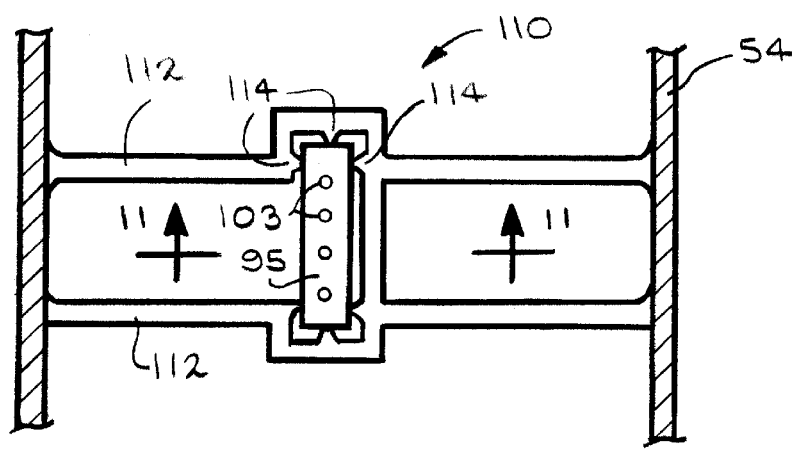
FIG. 10 is a sectional view of the Electronic Control Unit shown in FIG. 9 taken along line 10—10.
Figure 11:
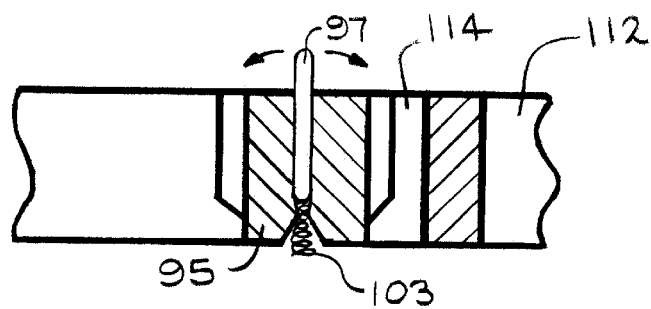
FIG. 11 is another sectional view of the Electronic Control Unit taken along line 11—11 in FIG. 10.

An alternate embodiment of the invention is shown in FIG. 9, where a support structure 110 has been molded integrally into the ECU housing 54. As shown in the plan view, FIG. 10, the support structure 110 includes a pair of support arms 112 which extend transversely across the housing 54. The support arms 112 surround the lower header 95 of the connector 90. A plurality of ribs 114 extend from the support arms 112 and engage the lower header 95. While six ribs 114 are shown in FIG. 10, it will be appreciated that the invention also can be practiced with more or less ribs 114. The ribs 114 cooperate with the lower header 95 to guide the connector 90 into position over the terminal contact pads 104. Accordingly, horizontal movement of the wire form buttons 103 relative to the contact pads 104, which may occur during assembly or be caused by vibration and thermal stresses in service and which could cause damage to the buttons 103, is minimized while vertical travel is allowed to absorb tolerance mismatches. The invention also contemplates relieving a portion of the ribs 114 adjacent to the lower header 95 to allow some movement of the lower header 95, as shown by the small arrows in FIG. 11.

Figure 12:
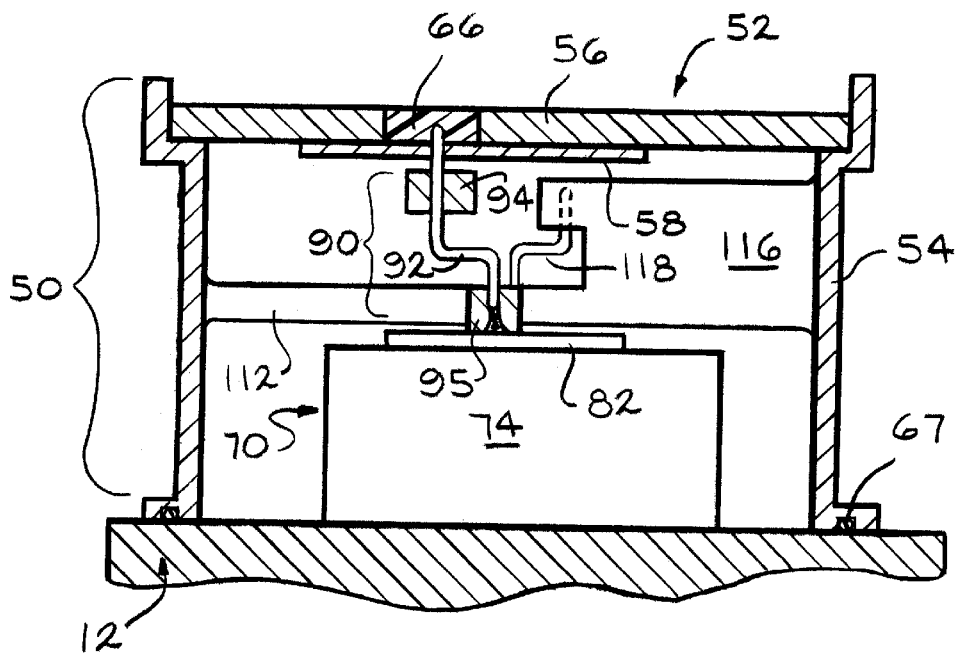
FIG. 12 is another alternate embodiment of the Electronic Control Unit shown in FIG. 9.

It is possible that the force needed to maintain appropriate compression of the wire form buttons 103 might result in a reaction force at the solder joint between the connector conductor upper portion 96 and the ECU PCB 58. If sufficiently large, such a reactive force could damage the solder joints. Accordingly, the invention also contemplates that an extended support arm 116 can be formed in the housing 54, as illustrated in FIG. 12. The extended support arm 116 includes a recess which receives a contact spring 118. The lower end of the contact spring 118 is formed in the lower header 95 with the connectors 92. The contact spring 118 is formed from the same material as the connectors 92 by a conventional process, such as reel to reel strip forming and insert molding. The contact spring 118 functions to augment the downward force being applied to the lower header 95 by the intermediate portions 98 of the connectors 92. In the preferred embodiment, two contact springs 118 are utilized with one located at each end of the lower header 95; however, more or less contact springs 118 can be used. Alternately, the extended support arm can extend from the left side of the housing 54 in FIG. 12 (not shown). When the support arm extends form the left housing side, the contact springs are reversed and have the same shape as the conductors 92, which simplifies fabrication.

Figure 13:
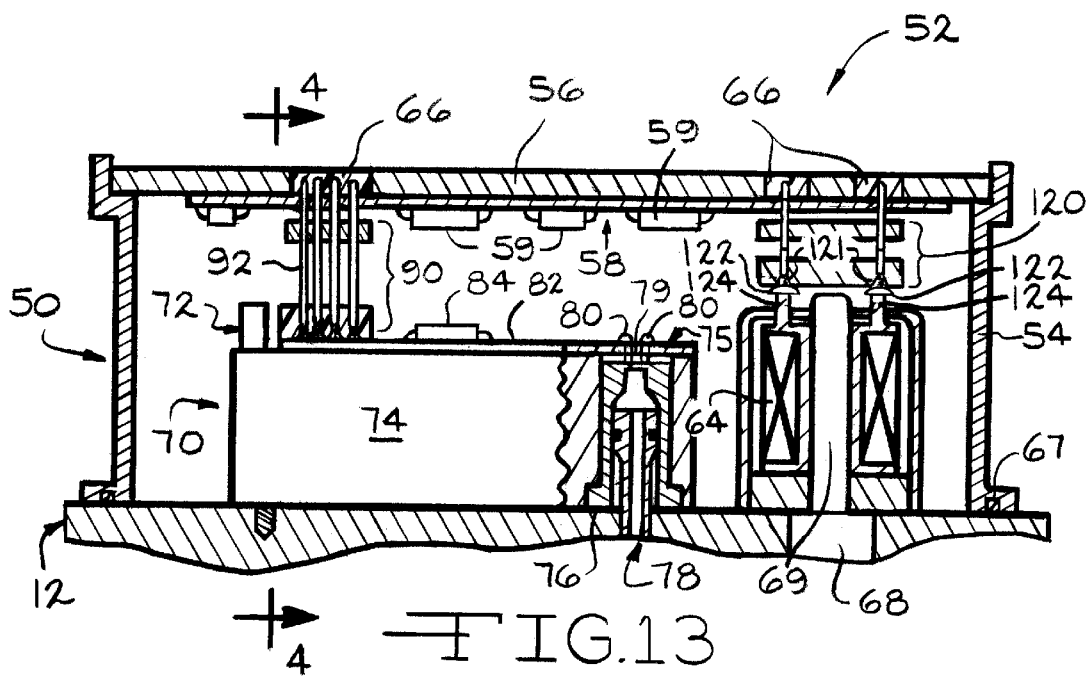
FIG. 13 illustrates another application of the electrical connector shown in FIG. 4.
Figure 14:
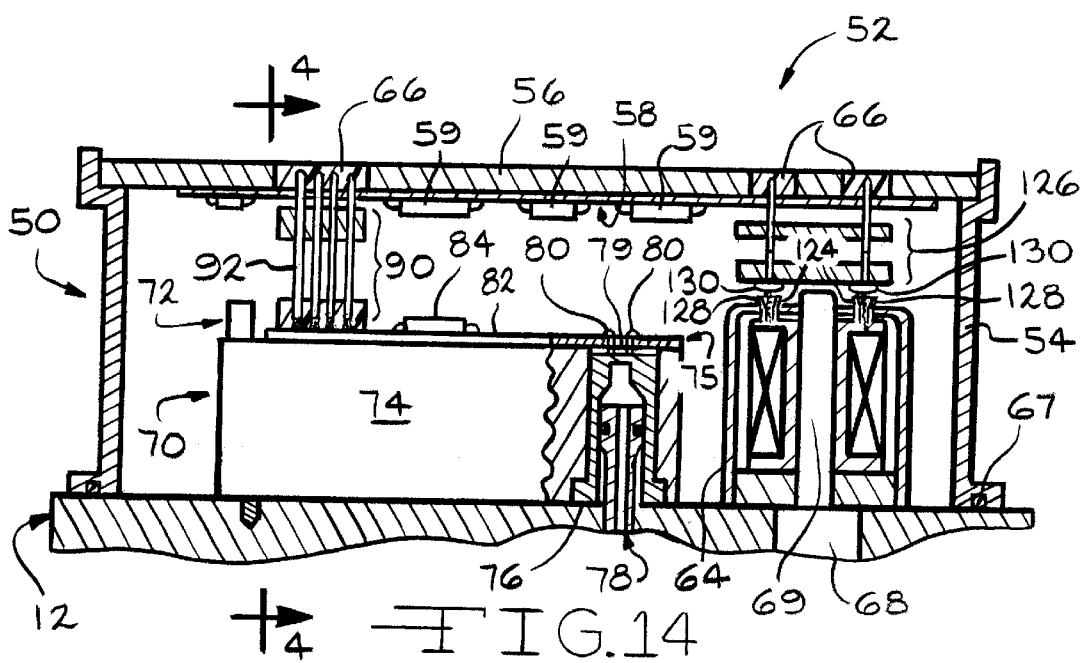
FIG. 14 is an alternate embodiment of the connector shown in FIG. 13.

It will be appreciated that the present invention also can be applied to other connections, such as the connections between the ECU PCB 58 and the solenoid coils, as shown in FIGS. 13 and 14. Components shown in FIGS. 13 and 14 which are similar to components shown in the preceding figures have the same numerical designators. In FIG. 13, a connector 120, which is similar to the connector 90 described above, is mounted upon the ECU PCB 58. The lower header of the connector 120 carries two wire form buttons 121 which cooperate with terminal pads 122 mounted on top of solenoid coil terminal posts 124. A similar connector 126 is illustrated in FIG. 4; however, wire form buttons 128 are mounted in recesses formed in the tops of the solenoid coil terminal posts 124. The wire form buttons 128 cooperate with terminal pads 130 mounted upon the lower header to form an electrical connection between the ECU PCB 58 and the solenoid coil 64. As described above, a support structure (not shown) for the lower headers of the connectors 120 and 126 can be integrally formed with the housing 54.

Figure 15:
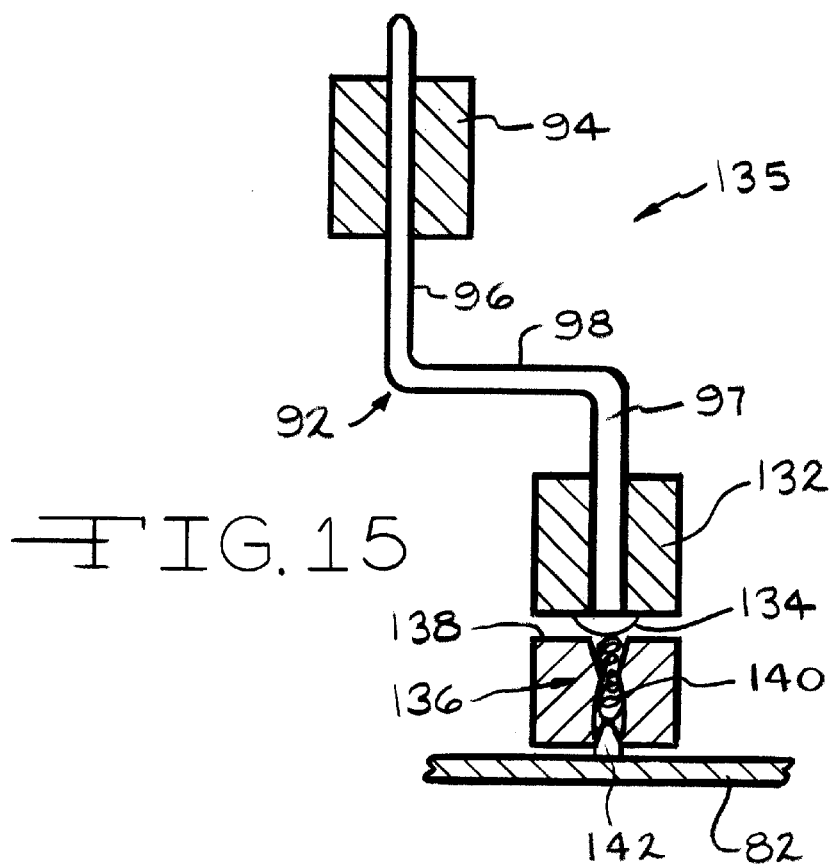
FIG. 15 is another alternate embodiment of the connector shown in FIG. 4.

Similarly, an alternate embodiment of the electrical connector 90 is shown generally at 135 in FIG. 15. Components in FIG. 15 which are similar to components shown in the preceding figures have the same numerical designators. A lower header 132 has a plurality of vertical bores formed therethrough, each of which receives the lower end 97 of one of the conductors 92. A contact pad 134 is mounted upon the lower end of each of the bores and is in electrical contact with the conductor 92 extending into the particular bore. A connector block 136 is mounted upon the PSC PCB 82 and has a plurality of vertical hourglass shaped bores 138 formed therethrough. A wire form button 140 is disposed within the each of the bores 138. A connector pin 142 extends upward from the PSC PCB 82 into the lower end of each of the bores 138. The connector pins 142 are electrically connected to circuit traces (not shown) deposited upon the surface of the PSC PCB 82. Accordingly, each of wire form buttons 140 provides an electrical connection between a corresponding contact pad 134 and a connector pin 142.

Figure 16:
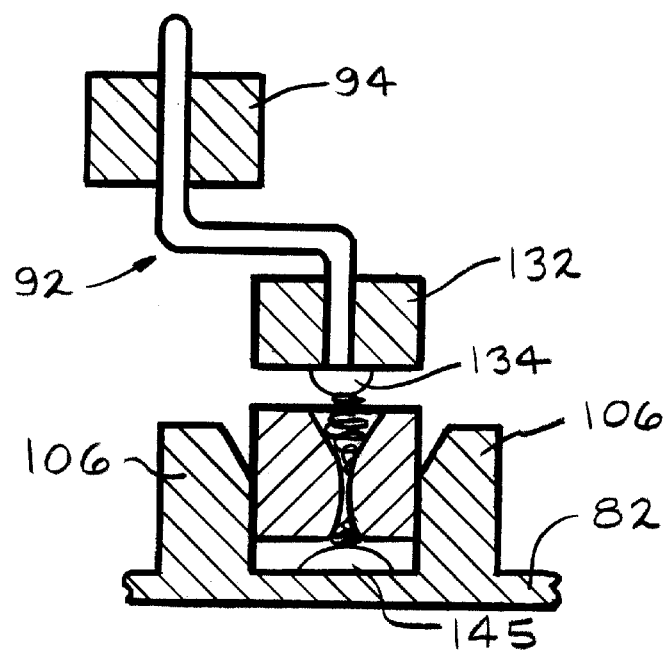
FIG. 16 is another alternate embodiment of the connector shown in FIG. 4.

Another alternate embodiment of the electrical connector is shown in FIG. 16, where the connector pins shown in FIG. 15 have been replaced by a surface contact pad 145. Components in FIG. 16 which are similar to components shown in FIG. 15 have the same numerical designators. Additionally, a pair of locator posts 106 extend from the ECU PCB 82 to retain the connector block 136 in position upon the ECU PCB 82, similar to the structure shown in FIG. 6. Alternately, a pair of support arms can extend transversely across the interior of the housing (not shown) as illustrated in FIG. 9 to maintain the connector block 136 in position.

It will be appreciated that the invention also can be practiced with the electrical connector 90 inverted (not shown) such that the first ends of the conductors are attached to the PSC PCB 82. For such a use, contact pads would be formed upon the ECU PCB 58.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the preferred embodiment was illustrated and described as being utilized with an EHB system, it will be appreciated that the invention also can be practiced with other systems, such as, for example, anti-lock braking systems, traction control systems and stability control systems.

What is claimed is:

1. An electrical connector assembly comprising:
   a first printed circuit board, said first printed circuit board being mounted within a housing;
   a plurality of conductors having first ends secured to said first printed circuit board and second ends opposite from said first ends, each of said conductors also including an intermediate portion between said first and second ends of said conductor that is formed as a spring;
   a first member formed from an electrically insulative material, said member having a plurality of bores formed therethrough, each of said bores having a first end and a second end opposite from said first end, each first end of said bore receiving a portion of one of said conductors that includes said second end of said conductor with another portion of said conductor that includes said first end and said intermediate spring portion of said conductor extending from said member;
   a plurality of wire form buttons with a single one of said wire form buttons disposed within each of said bores and contacting said second end of a corresponding one of said conductors, said wire form button extending from said second end of said bore;
   a second member formed from an insulative material, said second member having a plurality of bores formed therethrough, said first end of each of said conductors extending through one of said bores in said second member with said second member being spaced apart from said first member with said conductor intermediate portion disposed therebetween;
   a second printed circuit, said second printed circuit board being mounted upon a hydraulic control valve with said housing being removably attached to said hydraulic control valve, said second printed circuit board having a plurality of terminal contact pads formed upon a surface thereof, said intermediate spring portion of said conductor urging said first member and each of said wire form buttons toward a corresponding one of said terminal contact pads with said wire form buttons contacting said contact pads to form an electrical connection between said first printed circuit board and said second printed circuit board; and
   a support structure included upon said housing that receives said first block and positions said first bock relative to said second printed circuit board.

2. The electrical connector assembly according to claim 1 wherein said support structure includes a pair of support arms which extend across the interior of said housing and receive said first member therebetween.

3. The electrical connector assembly according to claim 2 wherein said support structure also includes a plurality of ribs extending from said support arms, said ribs engaging said first support member and retaining said first support member between said support arms.

4. The electrical connector assembly according to claim 2 wherein said support structure also carries at least one support structure spring, said support structure spring extending between a portion of one of said support arms and a surface of said first member, said support spring urging said member toward said second printed circuit board, whereby said wire form buttons are pressed against said terminal contact pads.

5. The electrical connector assembly according to claim 4 including a plurality of support springs.

6. The electrical connector assembly according to claim 5 wherein said hydraulic control valve is included in an electro-hydraulic brake system and said second printed circuit board carries a signal conditioning circuit for a pressure sensor cluster.

7. An electrical connector assembly comprising:
   a first printed circuit board;
   a plurality of conductors having first ends secured to said first printed circuit board and second ends opposite from said first ends, each of said conductors also including an intermediate portion between said first and second ends of said conductor that is formed as a spring;
   a member formed from an electrically insulative material, said member having a pluraltiy of bores formed therethrough, each of said bores having a first end and a second end opposite from said first end, each first end of said bore receiving a portion of one of said conductors that includes said second end of said conductor with another portion of said conductor that includes said first end and said intermediate spring portion of said conductor extending from said member;
   a plurality of wire form buttons with a single one of said wire form buttons disposed within each of said bores and contacting said second end of a corresponding one of said conductors, said wire form button extending from said second end of said bore;
   a second printed circuit board, said second printed circuit board having a plurality of terminal contact pads formed upon a surface thereof, said intermediate spring portion of said conductor urging said member and each of said wire form buttons toward a corresponding one of said terminal contact pads with said wire form buttons contacting said contact pads to form an electrical connection between said first printed circuit board and said second printed circuit board; and
   a pair of locator posts extending from said second printed circuit board, said locator posts being positioned adjacent to said terminal contact pads and external to said member, whereby said locator posts cooperate with said member to position said member adjacent to said terminal contact pads.

* * * * *